(12) United States Patent
Simon et al.

(10) Patent No.: US 6,963,355 B2
(45) Date of Patent: Nov. 8, 2005

(54) METHOD AND APPARATUS FOR ELIMINATING UNWANTED MIRROR SUPPORT IMAGES FROM PHOTOGRAPHIC IMAGES

(75) Inventors: Brad Simon, Bethel Park, PA (US);
Herman Herman, Pittsburgh, PA (US);
Michael Rondinelli, Bethel Park, PA (US); Sanjiv Singh, Pittsburgh, PA (US); Anthony Stentz, Pittsburgh, PA (US)

(73) Assignee: EYESEE380, Inc., Pittsburgh, PA (US)

( * ) Notice: Subject to any disclaimer, the term of this patent is extended or adjusted under 35 U.S.C. 154(b) by 689 days.

(21) Appl. No.: 10/081,837

(22) Filed: Feb. 22, 2002

(65) Prior Publication Data

US 2002/0130958 A1  Sep. 19, 2002

Related U.S. Application Data

(60) Provisional application No. 60/271,173, filed on Feb. 24, 2001, provisional application No. 60/271,154, filed on Feb. 24, 2001.

(51) Int. Cl.[7] .............................................. H04N 7/00
(52) U.S. Cl. ......................................... 348/36; 39/373
(58) Field of Search ........................... 348/36, 246, 39, 348/37, 88, 374; 382/167, 154

(56) References Cited

U.S. PATENT DOCUMENTS

| | | | |
|---|---|---|---|
| 3,846,809 A | 11/1974 | Pinzone et al. | |
| 4,326,775 A | 4/1982 | King | |
| 4,663,655 A | 5/1987 | Freeman | |
| 4,774,565 A | 9/1988 | Freeman | |
| 5,266,805 A | 11/1993 | Edgar | |
| 5,291,293 A | 3/1994 | Kapan | |
| 5,657,073 A | 8/1997 | Henley | |
| 5,754,706 A | 5/1998 | Schweid et al. | |
| 5,969,372 A | 10/1999 | Stavely et al. | |
| 6,097,434 A | 8/2000 | DeLeeuw | |
| 6,118,474 A | 9/2000 | Nayar | |
| 6,157,018 A | * 12/2000 | Ishiguro et al. | ......... 250/208.1 |
| 6,175,430 B1 | 1/2001 | Ito | |
| 6,603,878 B1 | * 8/2003 | Takemoto | .................... 382/167 |
| 6,744,931 B2 | * 6/2004 | Komiya et al. | ............. 382/284 |

OTHER PUBLICATIONS

M. Ollis et al., "Analysis and Design of Panoramic Stereo Vision Using Equi-Angular Pixel Cameras," The Robotics Institute, Carnegie Mellon University, CMU-RI-TR-99-04, Jan. 1999, pp. 1-43.

* cited by examiner

Primary Examiner—Ngoc-Yen Vu
Assistant Examiner—Anthony J. Daniels
(74) Attorney, Agent, or Firm—Lara A. Northrop, Esq.; Robert P. Lenart, Esq.; Pietragallo, Bosick & Gordon

(57) ABSTRACT

A method for eliminating unwanted portions of an image comprising the steps of generating a panoramic image including a plurality of image pixels, identifying a first set of the image pixels that correspond to the unwanted portions of the image, determining particular characteristics of the image pixels positioned adjacent to the image pixels in the first set of image pixels, and replacing the first set of image pixels with replacement pixel data generated by using the particular characteristics of the image pixels adjacent to the first set of image pixels. The replacement pixel data can be generated by interpolating or extrapolating pixel data from the image pixels positioned adjacent to the image pixels in the first set of image pixels. A panoramic photographic system that operates in accordance with the above method is also included.

16 Claims, 3 Drawing Sheets

METHOD AND APPARATUS FOR ELIMINATING UNWANTED MIRROR SUPPORT IMAGES FROM PHOTOGRAPHIC IMAGES

CROSS-REFERENCE TO RELATED APPLICATIONS

This application claims the benefit of U.S. Provisional Application Ser. No. 60/271,173 filed Feb. 24, 2001, and U.S. Provisional Application Ser. No. 60/271,154 filed Feb. 24, 2001.

FIELD OF THE INVENTION

The present invention relates to photographic imaging, and more particularly to methods and apparatus for eliminating unwanted portions of electronic images.

BACKGROUND INFORMATION

Recent work has shown the benefits of panoramic imaging, which is able to capture a large azimuth view with a significant elevation angle. If instead of providing a small conic section of a view, a camera could capture an entire half-sphere at once, several advantages could be realized. Specifically, if the entire environment is visible at the same time, it is not necessary to move the camera to fixate on an object of interest or to perform exploratory camera movements. This also means that it is not necessary to actively counteract the torques resulting from actuator motion. Processing global images of the environment is less likely to be affected by regions of the image that contain poor information. Generally, the wider the field of view, the more robust the image processing will be.

A panoramic camera is a device that captures light from all directions (i.e., 360 degrees), either as still images or as a continuous video stream. The images from such a device can be geometrically transformed to synthesize a conventional camera view in any direction. One method for constructing a panoramic camera combines a curved mirror and an imaging device, such as a still camera or video camera. The mirror gathers light from all directions and re-directs it to the camera. Both spherical and parabolic mirrors have been used in panoramic imaging systems.

Numerous examples of such systems have been described in the literature. For example, U.S. Pat. No. 6,118,474 by Nayar discloses a panoramic imaging system that uses a parabolic mirror and an orthographic lens for producing perspective images. U.S. Pat. No. 5,657,073 by Henley discloses a panoramic imaging system with distortion correction and selectable field of view using multiple cameras, image stitching, and a panflit-rotation-zoom controller.

Ollis, Herman, and Singh, "Analysis and Design of Panoramic Stereo Vision Using Equi-Angular Pixel Cameras", CMU-RI-TR-99-04, Technical Report, Robotics Institute, Carnegie Mellon University, January 1999, discloses an improved equi-angular mirror that is specifically shaped to account for the perspective effect a camera lens adds when it is combined with such a mirror.

Affixing the mirror to the camera is problematic, since any support structure necessary must appear in the device's field of view. One approach is to make this support structure transparent, by using a glass cylinder that mounts onto a standard camera lens mount. Another approach is to use a center post to support the mirror.

Both of these approaches have drawbacks. Light from the sun or another bright source striking the glass cylinder can produce a "flare", or line of bright illumination, in the panoramic image. Glass cylinders also attenuate the incoming light, leading to a darker image. The cylinders accumulate dirt, dust, and fingerprints, all of which degrade the image quality. The center post approach has drawbacks as well. It avoids the flares and fingerprints of the glass cylinder, but it leaves the curved mirror exposed to surface dirt. Furthermore, the center post support is inherently weak and prone to bending and optical misalignment. Finally, there is the issue of mounting it to the camera. There is no easy way to affix it to the camera other than boring through the camera's lens or affixing the post to a transparent lens attachment.

Rather than using a center post for support, one or more side struts can be used. Side struts provide better support and protection for the mirror, and they can be anchored to a standard threaded ring for easy attachment to the camera. Unfortunately, side struts obstruct the camera's field of view. The use of glass struts has been proposed to minimize this effect, but they can still lead to flares in the image.

Thus there is a need for a method for eliminating strut images from digital images.

SUMMARY OF THE INVENTION

A method for eliminating unwanted portions of an image comprising the steps of generating a panoramic image including a plurality of image pixels, identifying a first set of the image pixels that correspond to the unwanted portions of the image, determining particular characteristics of the image pixels positioned adjacent to the image pixels in the first set of image pixels, and replacing the first set of image pixels with replacement pixel data generated by using the particular characteristics of the image pixels adjacent to the first set of image pixels. The replacement pixel data can be generated by interpolating or extrapolating pixel data from the image pixels positioned adjacent to the image pixels in the first set of image pixels.

The particular characteristics can include red, green and blue color information, or hue, saturation and intensity information. The step of identifying a first set of the image pixels that correspond to the unwanted portions of an image can comprises the step of calibrating the location of a structure that produces the unwanted portion of the image, or determining particular characteristics of the unwanted portion of the image.

The invention also encompasses a panoramic photographic system that operates in accordance with the above method. The system can comprise a camera sensor generating a panoramic image including a plurality of image pixels, and a processor for identifying a first set of the image pixels that correspond to the unwanted portions of the image, for determining particular characteristics of the image pixels positioned adjacent to the image pixels in the first set of image pixels, and for replacing the first set of image pixels with replacement pixel data generated by using the particular characteristics of the image pixels adjacent to the first set of image pixels.

The particular characteristics can include red, green and blue color information, or hue, saturation and intensity information. The panoramic photographic system can further comprise a curved reflective mirror, and means for mounting the curved reflective mirror to the camera, wherein the mounting means includes at least one strut positioned in a field of view of the camera.

These and other aspects of the present invention will be more apparent from the following description.

DETAILED DESCRIPTION OF THE INVENTION

Figure 1:
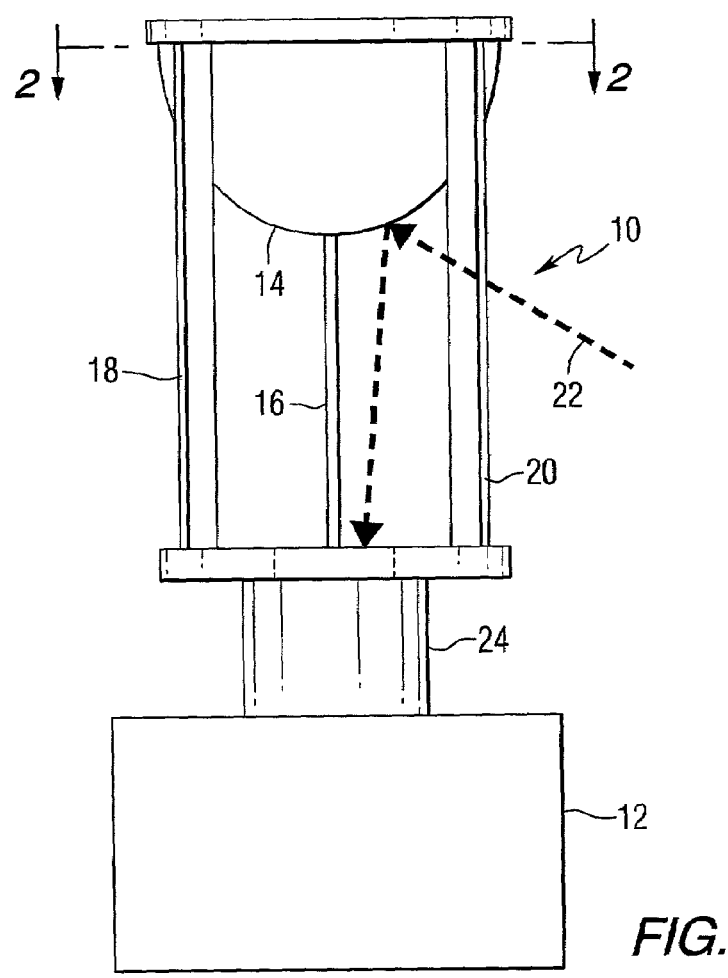
FIG. 1 is a side elevation view of a system for producing panoramic images including a camera with a convex reflective surface.

The present invention provides a method and apparatus for removing unwanted portions of an image captured by a panoramic camera system. Referring to the drawings, FIG. 1 is a side elevation view of a system 10 for producing panoramic images including a camera 12 and a convex reflective surface in the form of a mirror 14. The camera serves as a means for generating an image, and can be for example a digital still camera or a video camera. The mirror 14 is positioned on a common axis with the camera by a mounting structure that includes three struts 16, 18 and 20. Light rays 22 from the scene of interest are reflected off of the mirror and into a lens 24 of the camera 12.

Figure 2:
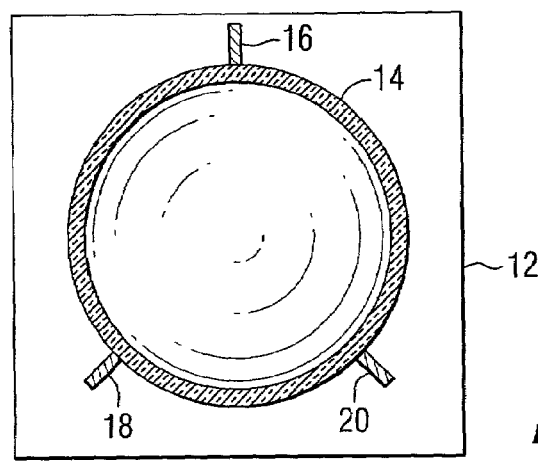
FIG. 2 is a cross-sectional view of the system of FIG. 1 taken along line 2—2.

FIG. 2 is a top plan view of the system of FIG. 1. In FIG. 2, the struts 16, 18 and 20 are shown to have a rectangular cross-section in a horizontal plane and a relatively narrow thickness in a directions perpendicular with respect to planes that are normal to the mirror, so that they block a minimal part of the light from the scene to be imaged.

Figure 3:
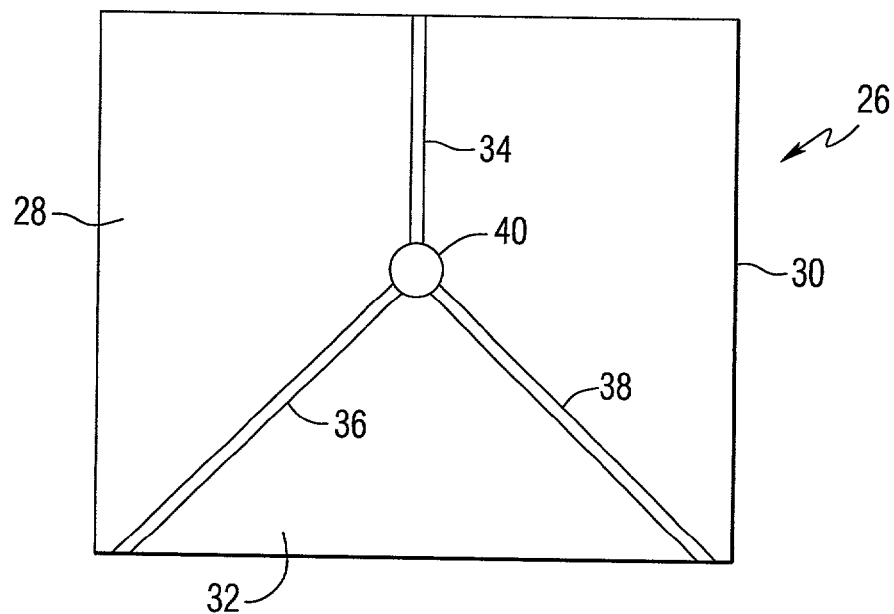
FIG. 3 is a schematic representation of raw panoramic image data produced by the system of FIG. 1.

FIG. 3 is a schematic representation of raw panoramic image data 26 produced by the system of FIG. 1. As shown in FIG. 3, the struts separate the image data into three sections 28, 30 and 32. Lines 34, 36 and 38 represent the images of the struts. The image of the camera lens is illustrated by the circle 40.

Figure 4:
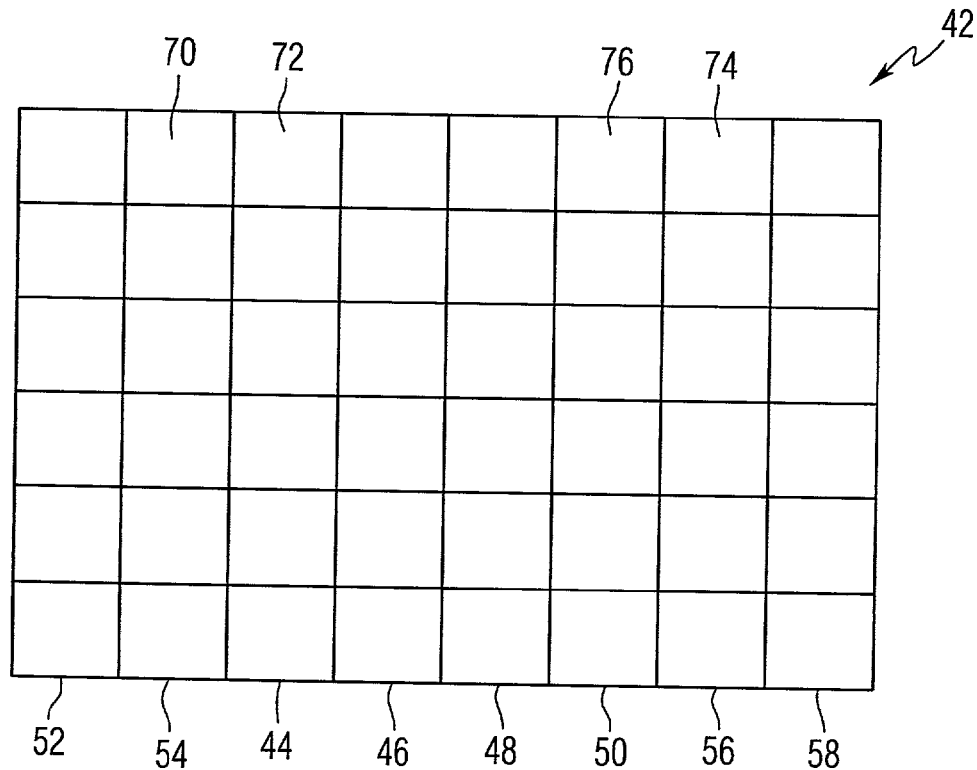
FIG. 4 is a schematic representation of selected pixels in a panoramic image produced by the system of FIG. 1.

FIG. 4 is a schematic representation of eight columns of pixels 42 in a panoramic image produced by the system of FIG. 1. In FIG. 4 four columns 44, 46, 48 and 50 represent pixels containing an image of a strut. Columns 52, 54, 56 and 58 represent pixels in the image of the scene of interest.

In the system of FIG. 1, a camera can image a full 360 degrees in azimuth and approach 180 degrees in elevation with an appropriately shaped mirror. One common application of this system is to capture a raw spherical image with the convex spherical surface, and unwarp the raw spherical image into a cylindrical image. The use of such imagery has distinct advantages. First, the camera uses a passive sensor, so power requirements are minimal. Second, it has the potential to be extremely robust, since the sensor is purely solid state and has no moving parts. Third, curved mirrors can be made free of optical distortion that is typically seen in lenses. Fourth, the large field of view offers substantial advantages for panoramic photography, target tracking, obstacle detection, localization, and tele-navigation of machinery.

This invention utilizes digital signal processing to eliminate the image of the strut(s) from the panoramic image. Once the mirror is affixed to the camera, the image of the struts is projected onto a fixed set of pixels in the camera's image sensor, which can be a charge coupled device (CCD) array. This remains true, regardless of how the panoramic camera system moves, or how objects in the scene move around it.

In order to perform the image processing of this invention, the particular pixels that are affected by the strut images must be determined. This fixed set of pixels can be determined in a variety of ways, including but not limited to: (1) permanently affixing the mirror to the camera and calibrating the set of pixels; (2) employing a mounting system for the mirror that locks the struts into known positions with respect to the camera, so that a prior calibration is valid; and (3) computer processing of the panoramic image after mounting the mirror to locate the image of the struts and record the strut pixel locations. The last method can be simplified by using a known, pronounced color for the struts and/or temporarily placing a cover over the panoramic camera (after mounting the mirror) to provide a high-contrast background for the strut image.

Once the set of strut image pixels is known, the image of the struts is eliminated from the panoramic image by replacing the strut image pixels with replacement pixel data. In one embodiment of the invention, the replacement pixel data is generated by interpolating the pixels adjacent to the strut pixels across the strut pixels. The idea behind an interpolation scheme is to replace the color values for the strut pixels with new values that smooth the color and intensity transition of the scene from one side of the strut image to the other, thereby "blending away" the image of the struts.

The pixels of FIG. 4 illustrate an example of an interpolation scheme. Each pixel contains red, green and blue image color information. In FIG. 4, the scene pixel 70 just to the left of pixel 72 that contains the strut image, has Red-Green-Blue (RGB) values of R1, G1, and B1. Scene pixel 74 just to the right of strut image pixel 76, has values R2, G2, and B2. The three color differences $dR=R2-R1$, $dG=G2-G1$, and $dB=B2-B1$ are linearly adjusted across the four strut image pixels 72, 76, 78 and 80 between the scene pixels. These four pixels receive the following interpolated values:

Pixel 72=$(R1+dR/5, G1+dG/5, B1+dB/5)$

Pixel 76=$(R1+2dR/5, G1+2dG/5, B1+2dB/5)$

Pixel 78=$(R1+3dR/5, G1+3dG/5, B1+3dB/5)$

Pixel 80=$(R1+4dR/5, G1+4dG/5, B1+4dB/5)$

The above example is a linear interpolation scheme in RGB space. Other color spaces can be used as well, including Hue-Saturation-Intensity (HSI). The interpolation can be based on more pixels than those that border the strut image pixels. A larger interpolation base minimizes noise effects at the expense of detail.

The interpolation can be applied to the raw panoramic image or to the "dewarped" image (i.e., geometrically transformed to a conventional camera image). Although interpolation eliminates the image of the struts in the panoramic image, it cannot recover the portion of the scene occluded by the struts. For this reason, it is desirable to make the struts as thin as possible (in the dimension facing the mirror). To maintain strength and support, the struts can be thick in the dimension parallel to planes that are normal of the mirror (see FIG. 2). For even greater strength, the struts can be beveled (see FIG. 5) such that the strut image is no wider than the edge facing the mirror. It is desirable for the struts to have non-reflective surfaces, to eliminate glare and blooming effects in the camera's CCD.

In another embodiment of the invention, the replacement pixel data can be generated by extrapolating pixel data from the pixels adjacent to the strut pixels. In both the interpolation and extrapolation approaches, the differences between the strut pixels and the adjacent pixels are effectively blended away in the final image.

The advantage of this invention over the prior art is that it eliminates flares and light attenuation common with glass cylinder supports while providing stronger mirror support and better protection than a single center post. The interpolation scheme eliminates the image of the struts from the panoramic image making the presence of the struts less noticeable.

Figure 5:
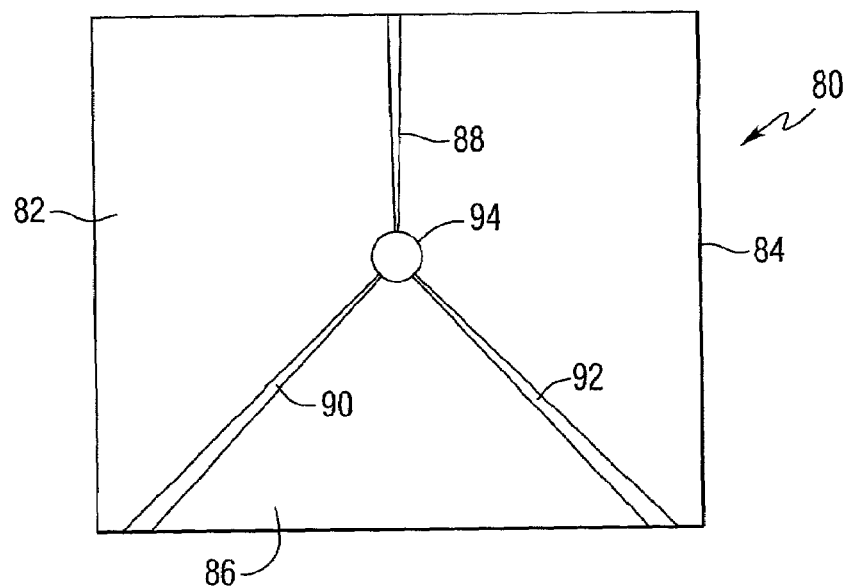
FIG. 5 is a schematic representation of different raw panoramic image data.

FIG. 5 is a schematic representation of different raw panoramic image data 80 produced by the system similar to that of FIG. 1, but using struts having a trapezoidal cross-section in the horizontal plane with the narrower side being closest to the mirror. As shown in FIG. 5, the struts separate the image data into three sections 82, 84 and 86. Lines 88, 90 and 92 represent the images of the struts. The image of the camera lens is illustrated by the circle 94.

Figure 6:
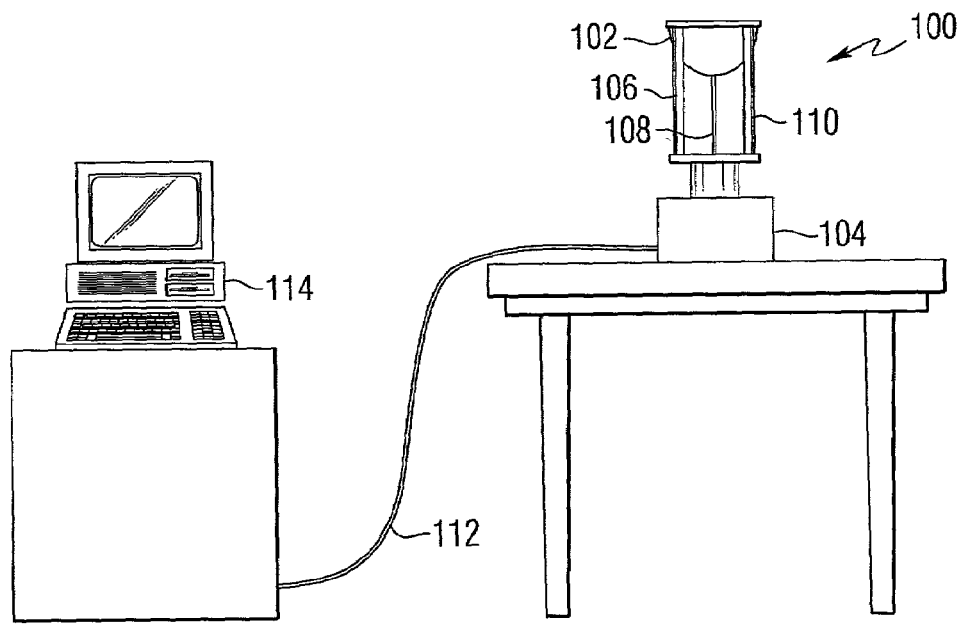
FIG. 6 is a schematic representation of a system for producing panoramic images that can utilize the invention.

FIG. 6 is a schematic representation of a system for producing panoramic images that can utilize the invention. A panoramic imaging device 100, including a curved mirror 102 mounted on a digital camera 104 via three struts 106, 108 and 110, is placed in a room. The panoramic imaging device is connected via a cable 112 to a computer 114. The digital camera captures a panoramic image of the entire room. This digital image is transmitted via a cable or a wireless link to a computer where it is stored on a hard disk, CD, or other storage device. Strut removal software processes the raw panoramic image to remove the image of the struts by blending the strut pixels into the scene via interpolation. Dewarping software on the computer converts the resultant image into a normal video image corresponding to a single viewing direction and displays it on the computer screen. The user changes the viewing direction using the mouse or keyboard. Instead of single images, a video stream can be digitized, stored, and displayed via computer.

The same data can be displayed over the Internet, for example, on a web page. If the data is displayed over the Internet, the dewarping software can also simultaneously generate images with different viewing directions to facilitate multiple viewers looking at different directions. It is also possible to send the unwarped images over the Internet and run the dewarping software on the viewer's machine.

Although the apparatus and method of the present invention has been primarily described for use in a panoramic imaging system, such as the system of FIG. 6, it is to be understood that the apparatus and method of the present invention can be used in any other system that would benefit from the advantages disclosed herein and is within the scope of the present invention.

Whereas particular embodiments of this invention have been described above for purposes of illustration, it will be evident to those skilled in the art that numerous variations of the details of the present invention may be made without departing from the invention as defined in the appended claims.

What is claimed is:

1. A method for eliminating unwanted portions of an image, the method comprising the steps of:
   generating a panoramic image including a plurality of image pixels;
   identifying a first set of the image pixels that correspond to the unwanted portions of the image;
   determining particular characteristics of the image pixels positioned adjacent to the image pixels in the first set of image pixels; and
   replacing the first set of image pixels with replacement pixel data generated by using the particular characteristics of the image pixels adjacent to the first set of image pixels, wherein the step of generating the panoramic image includes the steps of:
      mounting a convex mirror along a common axis with a camara, and
      using the camara to generate the panoramic image using light refleted off of the convex mirror, wherein the unwanted portions of the image correspond to portions of the image containing a mirror support structure.

2. The method of claim 1, wherein the replacement pixel data is generated by interpolating the particular characteristics of the image pixels adjacent to the first set of image pixels.

3. The method of claim 1, wherein the replacement pixel data is generated by extrapolating the particular characteristics of the image pixels adjacent to the first set of image pixels.

4. The method of claim 1, wherein the step of identifying a first set of the image pixels that correspond to the unwanted portions of an image comprises the step of:
   locating the image pixels that correspond to a predetermined characteristic of the mirror support structure.

5. The method of claim 1, wherein the step of identifying a first set of the image pixels that correspond to the unwanted portions of an image comprises the step of:
   determining particular characteristics of the unwanted portion of the image.

6. The method of claim 1, wherein the particular characteristics include:
   red, green and blue color information.

7. The method of claim 1, wherein the particular characteristics include:
   hue, saturation and intensity information.

8. A method for eliminating unwanted portions of an image, the method comprising the steps of:
   generating a panoramic image including a plurality of image pixels;
   identifying a first set of the image pixels the correspond to the unwanted portins of the image;
   calibrating the location of a structure that produces the unwanted portion of the image;
   determining particular characteristics of the image pixels positioned adjacent to the image pixels in the first set of image pixels; and
   replacing the first set of image pixels with replacement pixel data generated by using the particular characteristics of the image pixels adjacent to the first set of image pixels.

9. A panoramic photographic system comprising:
   a camera for generating a panoramic image including a plurality of image pixels;
   a processor for identifying a first set of the image pixels that correspond to the unwanted portions of an image, for determining particular characteristics of the image pixels positioned adjacent to the image pixels in the first set of image pixels, and for replacing the first set of image pixels with replacement pixel data generated by using the particular characteristics of the image pixels adjacent to the first set of image pixels;

a convex mirror; and a mount for positioning the mirror with respect to the camara, wherein the unwanted portions of the image correspond to portions of the image containing a mirror support structure.

10. The panoramic photographic system of claim 9, wherein the replacement pixel data is generated by interpolating the particular characteristics of the image pixels adjacent to the first set of image pixels.

11. The panoramic photographic system of claim 9, wherein the replacement pixel data is generated by extrapolating the particular characteristics of the image pixels adjacent to the first set of image pixels.

12. The panoramic photographic system of claim 9, wherein the camera and the mirror are positioned on a common axis, and the mirror support structure includes a plurality of struts extending in directions parallel to the common axis.

13. The panoramic photographic system of claim 12, wherein the struts each have a trapezoidal cross-sectional shape in a plane perpendicular to the common axis.

14. The panoramic photographic system of claim 12, wherein the struts each have a rectangular cross-sectional shape in a plane perpendicular to the common axis.

15. The panoramic photographic system of claim 9, wherein the particular characteristics include:

red, green and blue color information.

16. The panoramic photographic system of claim 9, wherein the particular characteristics include:

hue, saturation and intensity information.

* * * * *

UNITED STATES PATENT AND TRADEMARK OFFICE
CERTIFICATE OF CORRECTION

PATENT NO. : 6,963,355 B2 Page 1 of 1
APPLICATION NO. : 10/081837
DATED : November 8, 2005
INVENTOR(S) : Brad Simon et al.

It is certified that error appears in the above-identified patent and that said Letters Patent is hereby corrected as shown below:

On Title Page

Item (73) Assignee "EYESEE380, Inc." should read -- EYESEE360, Inc. --

Column 6, Line 48 (Claim 8)

"pixels the correspond to the unwanted portins of the image;" should read

-- pixels that correspond to the unwanted portions of the image; --

Signed and Sealed this

Tenth Day of April, 2007

JON W. DUDAS
*Director of the United States Patent and Trademark Office*